United States Patent [19]

Sistare

[11] Patent Number: 4,730,134
[45] Date of Patent: Mar. 8, 1988

[54] PORTABLE POWER TOOL WITH COMBINATION BEARING PLATE, NUT PLATE AND AUXILIARY HANDLE MOUNT

[75] Inventor: James R. Sistare, Pickens, S.C.

[73] Assignee: The Singer Company, Stamford, Conn.

[21] Appl. No.: 54,921

[22] Filed: May 28, 1987

[51] Int. Cl.$^4$ .............................................. H02K 5/16
[52] U.S. Cl. ..................................... 310/50; 310/89; 310/91; 384/438
[58] Field of Search ....................... 310/50, 47, 80, 90, 310/91; 74/421 A; 384/428, 434, 439, 440

[56] References Cited

U.S. PATENT DOCUMENTS

| | | | |
|---|---|---|---|
| 2,730,635 | 1/1956 | McCabe | 310/50 |
| 3,622,822 | 11/1971 | Lofstrand | 310/89 |
| 3,908,139 | 9/1975 | Duncan, Jr. | 310/50 |
| 4,223,744 | 9/1980 | Lovingood . | |

FOREIGN PATENT DOCUMENTS 180617 12/1954 Austria ................................... 310/50
606578 10/1960 Canada ................................... 310/50

Primary Examiner—Patrick R. Salce
Assistant Examiner—D. L. Rebsch
Attorney, Agent, or Firm—David L. Davis

[57] ABSTRACT

A portable power tool including a power unit housing having first and second housing segments joined together in clam shell fashion includes a tool head which is mounted to extend forwardly from the power unit housing by means of a bearing plate provided with tapped holes for reception of screws extending through the tool head. The bearing plate is contained entirely within the interior of the power unit housing, to avoid external seams by means of a clamping flange defining the forwardmost extent of the first and second housing segments. The bearing plate is formed with plural auxiliary handle mounts projecting from openings formed in the first and second housing segments for reception of auxiliary handles. The mounts are adjacent vents in the housing segments, promoting cooling of the bearings during operation.

11 Claims, 6 Drawing Figures

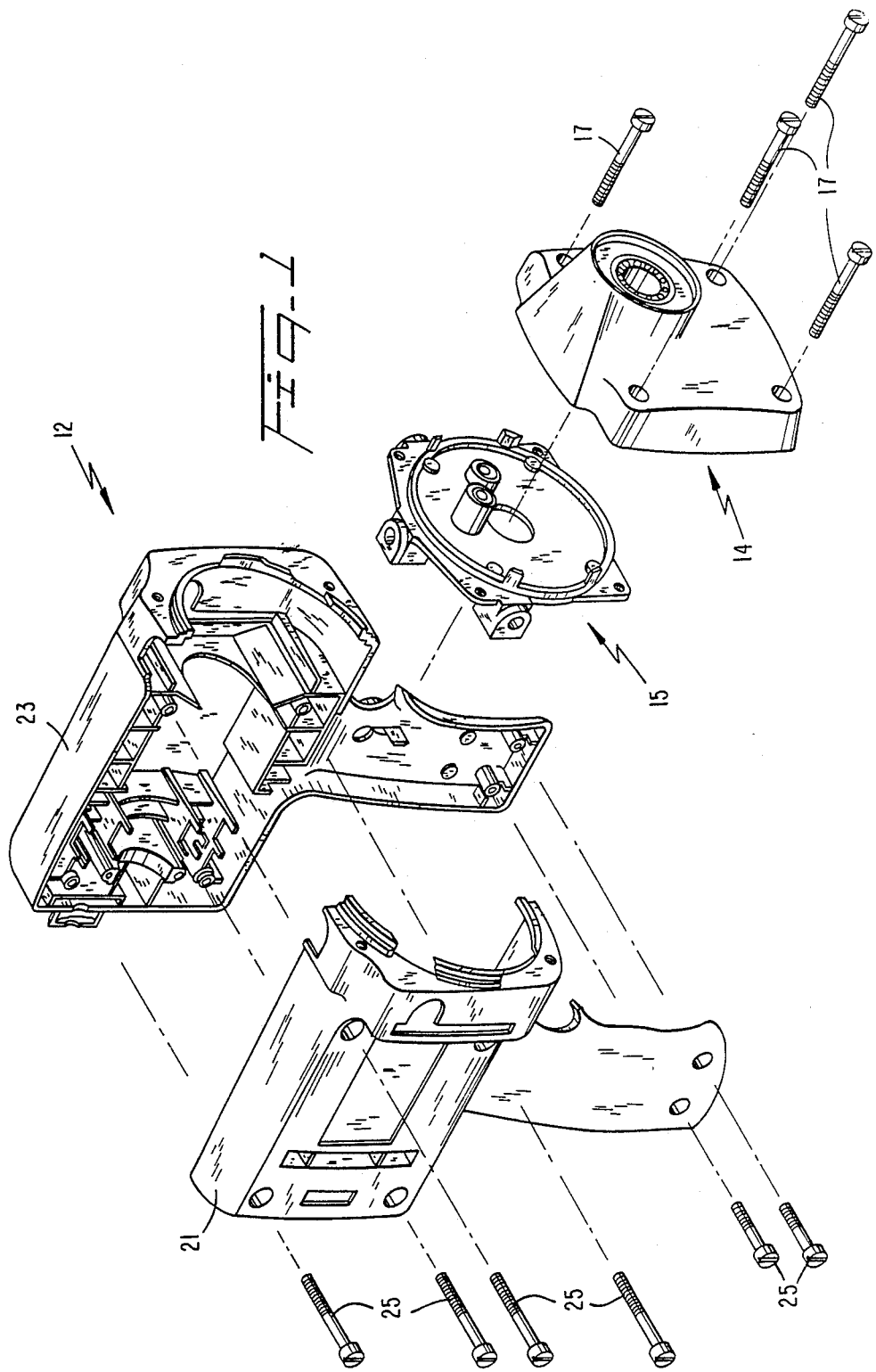

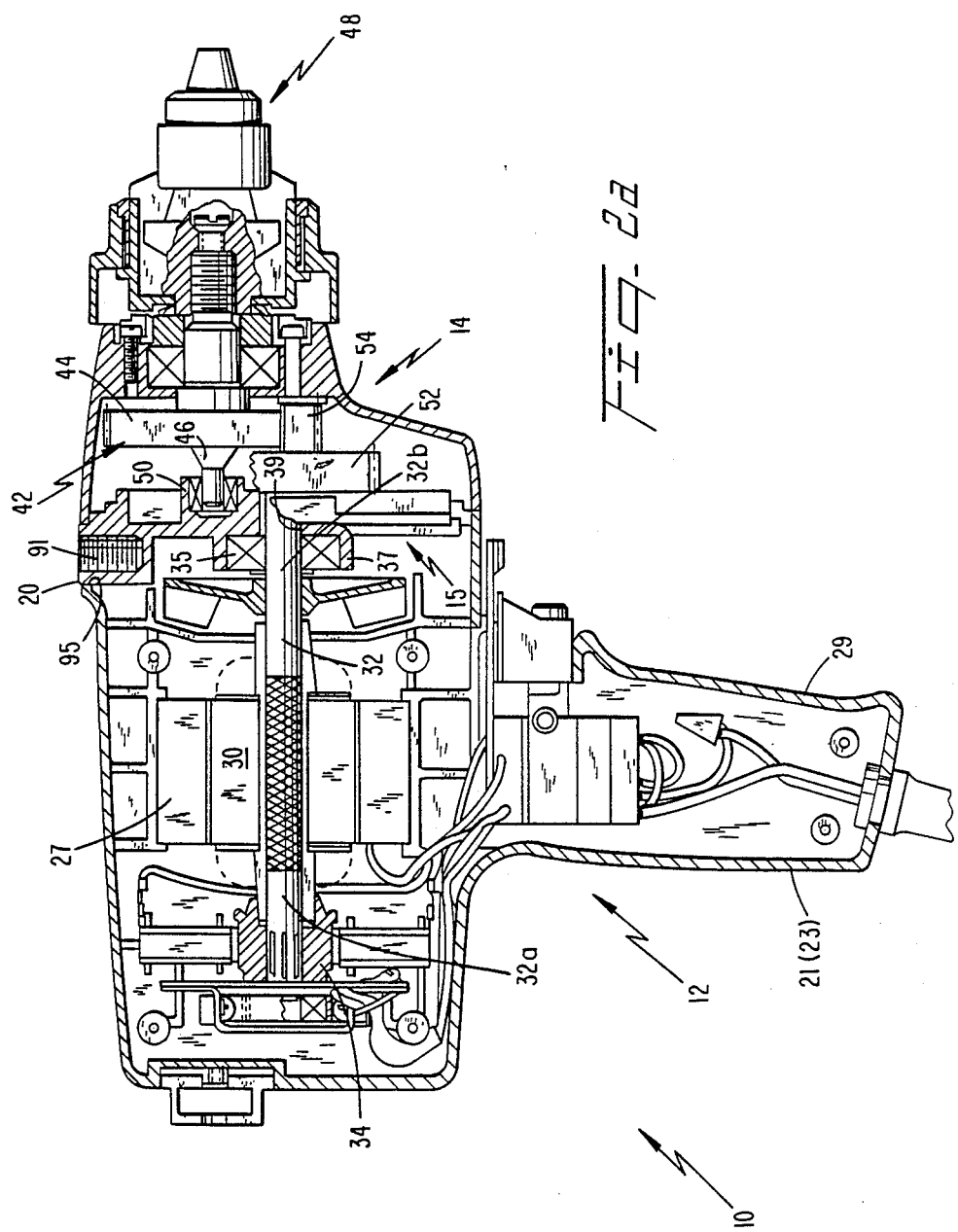

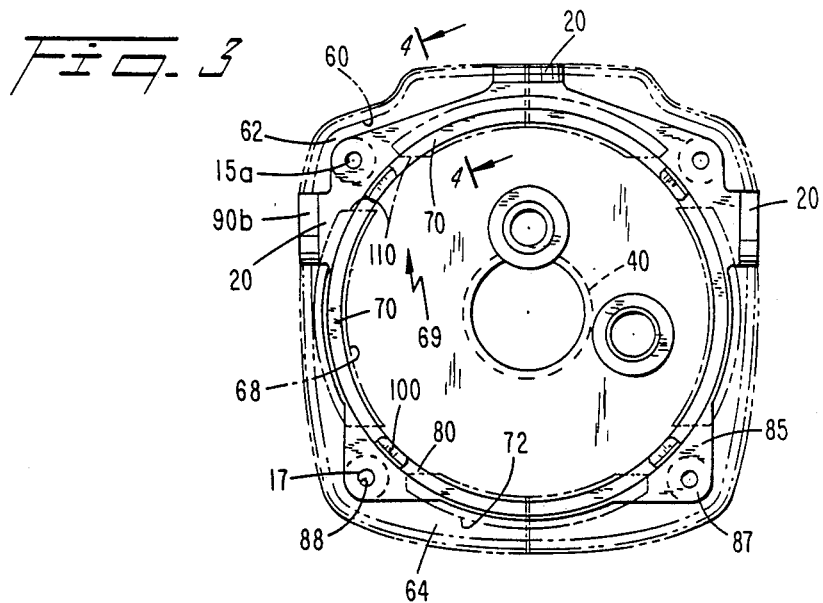
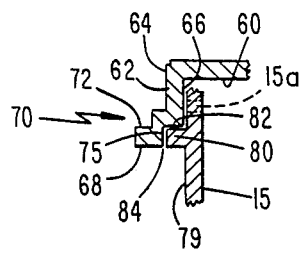
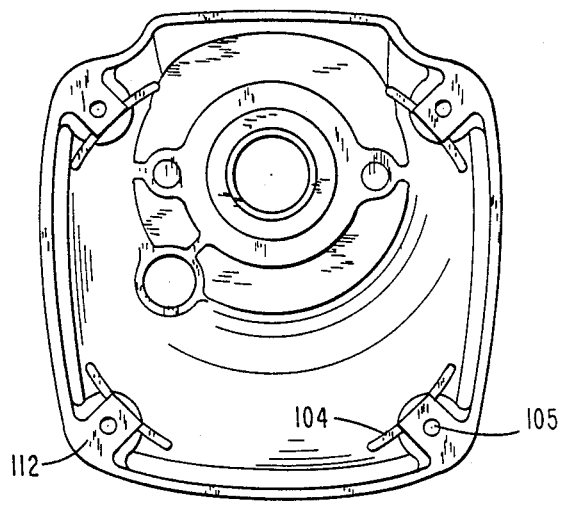

PORTABLE POWER TOOL WITH COMBINATION BEARING PLATE, NUT PLATE AND AUXILIARY HANDLE MOUNT

TECHNICAL FIELD

The present invention relates generally to portable power tools and, more particularly, to a multi-functional bearing plate construction used to clamp a tool head to a power unit housing while providing lugs for auxiliary handles.

BACKGROUND ART

Portable power tools such as a type disclosed in U.S. Pat. No. 3,908,139 to Duncan, Jr., or U.S. Pat. No. 4,223,744 to Lovingood generally comprise a motor housing unit and a tool head housing clamped with screws thereto to project forwardly from the motor housing. A bearing plate is provided for journaled reception of a motor shaft and spindle and intermediate shafts supporting the gear train within the tool head. In the prior art designs noted above, this bearing plate forms an external seam with both the tool head and motor housing which often, and disadvantageously, causes a contour mismatch between the motor housing, bearing plate and tool head. Additionally, in the aforesaid known designs, considerable and precise machining of the bearing plate with two rabbet diameters respectively on opposite sides of the plate is required for mounting said plate to the housings.

Another difficulty associated with the foregoing designs is the requirement of a separate nut plate, often referred to in the art as a strip nut, which must be mounted within the motor unit housing as a separate part from the bearing plate to secure the tool head to the motor housing. The provision of a separate screw or nut plate increases the weight of the portable tool and also results in further machining requirements in the fabrication of this part, resulting in an increased manufacturing cost.

It is accordingly one object of the present invention to provide a bearing plate within a portable power tool that is multi-functional, serving as a bearing mounting plate and a nut plate for clamping the tool head to the motor housing unit.

Another object is to provide a bearing plate that also serves as a three-position auxiliary handle mount.

It is another object of the present invention to provide a bearing plate that is mounted internally within the motor unit housing, resulting in the elimination of an external seam between the bearing plate and the motor housing or tool head which may otherwise result in a possible contour mismatch.

Still another object is to provide a bearing plate that results in an overall reduction of length of the power tool by virtue of the internal mounting arrangement of the bearing plate within the power unit housing.

Still another object is to provide a bearing plate having simplified machining requirements.

Yet a further object is to provide a bearing plate having plural auxiliary handle mounts in the form of lugs positioned adjacent air vents in the motor housing for better cooling of bearings due to heat sink action of aluminum in the air stream.

Still another object is to provide a bearing plate eliminating an external seam, as occurs between the motor housing and tool head in prior art designs, and which further results in lower weight of the portable power tool by enabling the bearing plate to function as a nut plate, thereby eliminating a separate part.

SUMMARY OF THE INVENTION

The present invention relates to a novel portable power tool wherein a bearing plate entrapped in the power unit housing is used to clamp a tool head to the power unit housing. The portable power tool, in the preferred embodiment, includes a pair of housing segments secured together in claim shell fashion with the tool head projecting from the co-joined housing segments. The bearing plate is detachably entrapped in fixed position in the power unit housing behind a clamping flange formed in front portions of the housing segments. The bearing plate is provided with journals on opposite sides thereof for reception of bearings supporting the motor shaft, a tool head spindle shaft and an intermediate shaft within the tool head. A plurality of tapped holes are provided in corner portions of the bearing plate located behind the clamping flange for reception of corresponding plural screws extending through the tool head.

In accordance with a preferred feature of the present invention, the bearing plate is preferably mounted within the interior of the power unit housing, eliminating the formation of an external seam behind it, the power unit housing and the tool head which may otherwise result in a possible contour mismatch. The bearing plate may preferably be formed with plural lugs projecting from openings formed in the power unit housing side wall for threaded reception of auxiliary handles. The lugs or auxiliary handle mounts are preferably formed adjacent air vents in the power unit housing side wall to promote better cooling of bearings due to heat sink action of aluminum in the air stream.

The bearing plate is maintained in proper axial and radial alignment by means of an annular mounting ridge projecting from a front surface of the bearing plate. This mounting ridge, which is machined to constitute the only single rabbet diameter in the bearing plate, is seated within an annular groove formed in the clamping flange. The tapped holes are provided in corner projections of the bearing plate formed at 90° intervals from each other radially outward from the mounting ridge. These corner projections are in juxtaposed alignment with holes formed in the clamping flange through which screws passing through the tool head are received.

The annular mounting groove in the flange is formed as a series of circumferentially spaced stepped portions between which respectively extend guide projections formed to project forwardly from the mounting ridge of the bearing plate. These guide projections provide initial contact with corresponding alignment projections formed in interior corner portions of the tool head, and also serve as contact bearing surfaces together with a radial outward facing surface of the stepped portions forming the annular groove. These contact and alignment surfaces provide proper alignment between the assembled housing segments of the power unit housing and the tool head.

Other objects and advantages will be apparent from the following description of the invention and the novel features will be particularly pointed out herinafter as set forth in the appended claims.

BRIEF DESCRIPTION OF THE DRAWING

FIG. 1 is an exploded perspective view of the portable power tool members incorporating the present invention;

FIGS. 2a and 2b are cross-sectional side elevational views of the power tool and the bearing plate mounted therewithin in accordance with the present invention;

FIG. 3 is a front elevational view of the bearing plate mounted within the power unit housing with the tool head removed;

FIG. 4 is a sectional view taken along the line 4—4 of FIG. 3; and

FIG. 5 is a rear interior view of the tool head, with the gear train and chuck assembly removed, depicting contact bearing surfaces enabling proper alignment between and clamping of the tool head and power unit sections via the bearing plate of the present invention.

BEST MODE FOR CARRYING OUT THE INVENTION

Figure 2B:
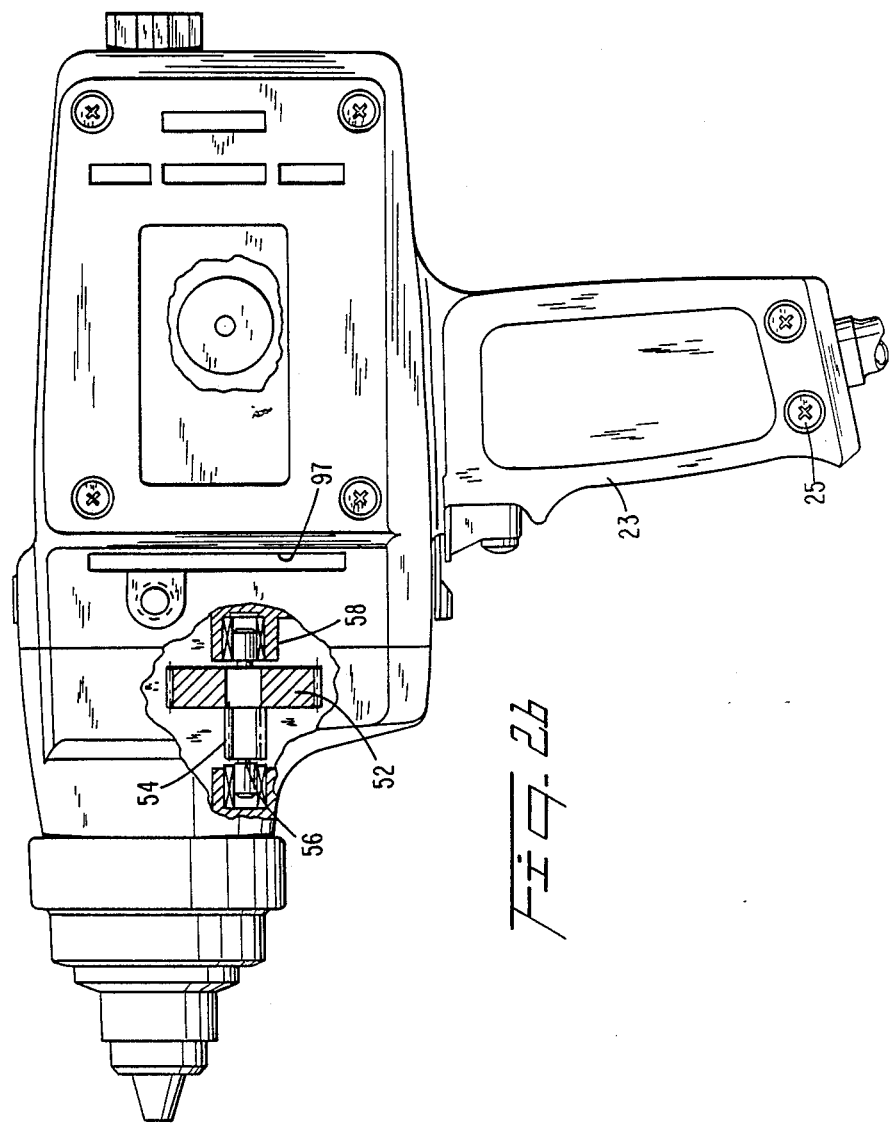

Referring generally to FIGS. 1-5 of the drawing, a portable power tool 10 in accordance with the present invention comprises a motor housing 12 with a tool head 14 extending therefrom. Motor housing 12 and tool head 14 are connected together with a unique bearing plate 15 of the present invention. The novel construction of bearing plate 15 enables it to function as a nut plate for clamping tool head 14 to motor housing 12 with screws 17 which pass through the tool head for threaded reception with tapped holes 15a of bearing plate 15. The bearing plate 15 may be further formed with three auxiliary handle mounts 20 exposed externally of motor housing 12. As discussed more fully below, the bearing plate 15 is uniquely formed with a single rabbet diameter to position the bearing plate within the motor housing 12, which internal mounting of the bearing plate advantageously decreases the overall length of the power tool while eliminating an external seam.

The motor or power unit housing 12 comprises a pair of housing segments 21 and 23 secured together in clam shell fashion by screws 25 engageable with the other side of segment 23. The segment 21, which may be die cast plastic or other suitable material, is formed with a motor mount section such as 27 and an integral depending handle portion 29. Motor mount section 27 accommodates a motor 30 shown in dotted line in FIG. 2a. Motor 30 includes an armature shaft 32 having a rear end 32a journaled in bearing 34 and a forward end 32b journaled in a bearing 35 disposed within a central rearwardly extending journal section 37 formed in the bearing plate 15.

The forward end 32b of shaft 32 projects through an opening 39 formed in bearing plate 15 and has a drive pinion 40 (FIG. 3) extending into tool head housing 14 to drive a gear train 42 (FIG. 2a). The last of the gear train 42 is a spindle gear 44 fixed to a spindle shaft 46 carrying a chuck 48 at a forward end thereof externally of the power tool 10. The rear end of spindle shaft 46 is received within a forwardly projecting journal section 50 formed in bearing plate 15. The spindle shaft 46 may be driven to supply rotative torque to the chuck 48 through intermediate driven gears 52 and 54 carried on intermediate drive shaft 56 having a rear end 56a journaled in a second forwardly projecting journal section 58 in bearing plate 15 (FIGS. 2a and 2b). The driven gear 54 is in mesh with pinion 40 to drive the gear 54 in contact with spindle gear 44.

As best depicted in FIGS. 1 and 3, the housing segments 21 and 23 are symmetrically similar to each other and each includes an interior surface 60 terminating in a front clamping flange 62 having a front surface 64 and a rear surface 66, defining therebetween a semi-cylindrical cutout 68, jointly forming a cylindrical cutout 69 when the housing segments are fastened together. Along the arcuate edge of clamping flange 62, defining cutouts 68, there are formed at circumferentially spaced intervals from each other a plurality of forwardly extending stepped portions 70. These stepped portions 70, when housing segments 21,23 are joined together in the manner described supra, define a radially outward facing annular alignment surface 72, projecting forwardly from front surface 64, which will assist in proper and easy mounting of tool head 14 to motor housing 12 in the manner discussed more fully below. The stepped portions 70 further define a rearward facing annular alignment groove 75 recessed forwardly from rear surface 66 (FIG. 4) and located between said rear surface and cutouts 68. As discussed more fully below, annular alignment groove 75 defines a seat for receiving bearing plate 15 against the rear wall surface 66 of clamping flange 62.

With reference to FIGS. 2a, 2b and 3, particulars of bearing plate 15 will now be discussed. The bearing plate 15 is preferably fabricated from die-cast aluminum which is molded and machined to form the rearwardly extending journal section 37 (FIG. 2a) in the rear surface of bearing plate 15 and the forwardly extending journal sections 50 (FIG. 2a) and 58 (FIG. 2b) in the front surface 79 of plate 15. This front surface 79 of bearing plate 15 is further formed with an annular mounting ridge 80 machined with a single rabbet diameter. Mounting ridge 80 is received within alignment groove 75 (FIG. 4) to maintain the journal sections in respective alignment with their associated shafts. More specifically, this alignment is achieved by machining the mounting ridge 80 to have an annular, radially outward facing nesting surface 82 and an annular front stop surface 84 received against corresponding side walls of the groove 75. The annular nesting surface 82 is machined to a first predetermined radial dimension or single rabbet diameter slightly less than the corresponding diameter of annular groove 75.

Bearing plate 15 is further formed with four corners 85 (FIG. 3) projecting radially outward from mounting ridge 80 and formed at 90° intervals from each other. These corners 85 are received against the rear surface 66 of clamping flange 62. Each corner 85 is provided with a threaded hole 15a extending through a boss 87. The threaded holes 15a are in alignment with untapped holes 88 in corresponding portions of clamping flange 62 overlapping the corners. The threaded holes 15a receive the screws 17 extending through tool head 14 and, in this manner, the bearing plate 15 functions as a fastener receiving member similar to that known in the art as a nut plate or a strip nut provided for clamping the tool head 14 to the power unit housing 12.

With reference now to FIGS. 2a and 3, bearing plate 15 in accordance with the present invention may be provided with three auxiliary handle mounts 20 in the form of a top mount 90a and laterally projecting mounts 90b, the latter formed slightly below the upper corners 85 with the former projecting upwardly between the upper corners. The mounts 20, as best depicted in FIG.

2a, may be formed as rectangular blocks projecting rearwardly from the rear surface of bearing plate 15 with tapped holes 91 for threaded reception of auxiliary handles (not shown). The mounts 20 are received within cutouts 95 formed in the interior surfaces of the side walls of housing segments 21 and 23. The surfaces of cutouts 95 define alignment surfaces assisting clamping flange 62 in preventing axial movement of bearing plate 15.

A plurality of vents 97 (FIG. 2b) are formed in the side walls of housing segments 21 and 23 rearwardly adjacent the laterally extending pair of auxiliary handle mounts 90b. The location of vents 97 relative to the mounts 90a, 90b advantageously assist in promoting better cooling of the bearings during operation of power tool 10.

Mounting ridge 80 of bearing plate 15 is further formed with a plurality of forwardly extending guide projections 100 (FIG. 3) which respectively extend between two adjacent stepped portions 70 and radially inwardly adjacent each corner 85 as depicted in FIG. 3. Each guide projection 100 is roughly the same height as the height or axial extent of the radially outward facing annular alignment surface 72 formed on clamping flange 62. The purpose of the guide projections 100 which are also formed in the same radial plane as the radial outward surface 72 is to direct the surface 72 into contact with corresponding alignment surfaces 104 (FIG. 5) formed in interior corner portions of tool head 14 when the parts are positioned together. Thus, the guide projections 100 and the milled alignment surfaces 104 function so that the annular surface 72 of clamping flange 62 can properly engage the radially inward facing alignment surfaces 104 on the tool head. This engagement aligns the fastener holes 105 in the interior corner portions of tool head 14 with the threaded holes 15a in the bearing plate 15 to permit the parts to be threadedly fastened together.

In a preferred sequence of assembling the portable power tool 10, the motor 30, a switch (not shown) and other conventionally associated electrical components are positioned in the segment 23 in any suitable known manner, with bearing plate 15 placed within the segment 23 with one of lateral auxiliary mounts 90b received in the corresponding opening in the housing side wall, and one-half of mounting ridge 80 received within the associated one-half of alignment groove 75 in the housing segment. The bearing 35 is mounted within journal section 37 and the drive shaft 32 projects forwardly of the bearing plate 15 through opening 39 therein with drive pinion 40 mounted on the forward end. With reference to FIG. 3, the circumferential spacing between adjacent stepped portions 70 and the guide projections 100, and in particular, and the oblique end walls 110 of the stepped portions with the guide projection permits a slip-fit of the bearing plate 15 into the one-half of alignment groove 75 formed in housing segment 23 such that the associated corners 85 abut against the rear surface 66 of clamping flange 62 and the interior surface 60 of the housing segment.

With the bearing plate 15 thus seated in the groove 75, the other housing segment 21 is fitted to the remaining half of bearing plate 15 and other parts of the housing segment 23 in clam shell fashion by means of the screws 25. The bearing plate 15 is thus securely entrapped between the now secured clam shell housing segments 21,23 and is internally mounted within the power unit housing, with only auxiliary handle mounts 90 projecting to the exterior of the housing through openings 95. The mounting ridge 80 and the corners 85 are firmly entrapped within the clam shell housing ready for attachment of tool head 14 in the preferred sequence of assembling the portable power tool 10.

The tool head 14 is aligned with segments 21,23 by directing the rear part of the tool head into juxtaposition with the clamping flange 62. The gear train and chuck are pre-assembled with bearings for supporting the rear ends of the spindle shaft and intermediate drive shaft already mounted within the forward facing journal sections formed in the front surface of the bearing plate. As the tool head 14 is moved towards the clamping flange 62, the milled alignment surfaces 104 formed in the interior corner portions of the tool head engage the guide projections 100 so that the milled alignment surfaces 104 can then properly engage the annular alignment surface 72 on the segments 21 and 23. This engagement aligns the fastener holes 88 in the clamping flange with the threaded holes 15a in the corner portions 85 of bearing plate 15 and permits the pinion 40 on the forward end of motor shaft 32 to mesh with the intermediate drive gear 52.

As the screws 17 progressively engage the threaded holes 15a in the bearing plate 15, the rear wall 112 of tool head 14 is drawn against the front surface 64 of clamping flange 62. The rear wall 112 thus defines a contact surface for bearing against the segments 21 and 23 for forming a seam with the segments. The force between the rear wall 112 of tool head 14 and the front edge surfaces 64 of clamping flange 62 induced by the screws 17 engaging the threaded holes 15a in bearing plate 15 is opposed by the clamping flange alignment groove 75 acting against the mounting ridge 80. The tool head 14 is thus clamped to the motor housing 12 by the fasteners 17.

It is within the scope of the present invention, as will be apparent to those skilled in the art from the foregoing description, that power tool 10 can be assembled in other sequences, depending upon the degree to which various fasteners are tightened and various motor and gear parts are assembled. It will also be apparent that the portable power tool 10 can be powered from a source of energy other than an electrically motorized power unit, such as a pneumatic power unit.

Some advantages of the novel portable power tool 10 evident from the foregoing description include a bearing plate 15 serving as a bearing mounting plate, a nut plate and a three-position auxiliary handle mount. The bearing plate 15 is carried internally of the clam shell motor housing 12 with only the three auxiliary handle mounts 90 exposed externally of the housing. The bearing plate 15 is formed with a single rabbet diameter to position the bearing plate to the clam shell motor housing and also to the tool head housing with simplified machining. The overall length of the power tool 10 is shorter because of the internal mounting of bearing plate 15, which internal mounting also eliminates an external seam where the bearing plate would otherwise mate with the motor housing, causing a possible contour mismatch. By having the bearing plate function as a screw or nut plate, it also eliminates separate nut plate parts. In addition, by positioning the auxiliary lugs for the auxiliary handles adjacent the air vents, better cooling is expected. Generally, bearing plate 15 of the invention enables the presently disclosed arrangement of parts to be made with less exacting tolerances than are normally required in structures having bearing plates forming an external seam with the tool head and motor housing portions.

In view of the above, it will be seen that the several objects of the invention are achieved and other advantageous results obtained.

As various changes can be made in the above construction without departing from the scope of the invention, it is intended that all matter contained in the above description are shown and the accompanying drawings shall be interpreted as illustrative in nature and not in a limiting sense.

What is claimed is:

1. A portable power tool comprising, in combination:
a power unit housing formed with a front edge surface and a gripping handle and a motor having a shaft journaled in the housing;
a tool head mounted forwardly of the power unit housing and connected thereto by screws extending through the tool head for threaded reception in the power unit housing, said tool head being formed with a rear edge surface;
a bearing plate formed on opposite sides thereof with surfaces providing therein bearing support for the motor shaft and the tool head, with tapped holes receiving the screws in fastening contact so that the bearing plate functions as a nut plate, and with a peripheral edge to position the bearing plate within the power unit housing enabling the front edge surface of the power unit housing and the rear edge surface of the tool head to contact each other without forming an external seam with said bearing plate;
said power unit housing including first and second housing element, and means for securing the housing elements together with the motor shaft projecting forwardly of the power unit housing through the bearing plate;
a plurality of auxiliary handle mounts integrally formed at a peripheral portion of the bearing plate, each in the form of a cylindrical tapped bore having a longitudinal axis generally perpendicular to the longitudinal axis of the portable power tool, one of said auxiliary mounts being formed in an uppermost surface of the bearing plate, and another of said auxiliary mounts projecting from a lateral generally vertical edge of the bearing plate;
a plurality of vents formed in the power unit housing walls, said vents being disposed rearwardly adjacent the auxiliary handle mounts to provide cooling air for bearings; and
alignment projections formed to project inwardly from and disposed adjacent said front edge surfaces of the power unit housing to define a clamping flange disposed between the bearing plate and tool head against which flange the tool head is clamped.

2. The portable power tool of claim 1, wherein said clamping flange is formed with a stepped portion defining an alignment groove facing rearwardly towards the bearing plate.

3. The portable power tool of claim 2, wherein a front surface of the bearing plate facing the tool head is machined to define a mounting ridge having a single rabbet diameter, said mounting ridge being received within the alignment groove.

4. The portable power tool of claim 3, wherein said mounting ridge and alignment groove are annular in shape, said power unit housing being formed with openings in a front portion thereof located between the claiming flange and vents for reception of the auxiliary handle mounts.

5. The portable power tool of claim 4, wherein each auxiliary handle mount is formed radial outward from the mounting ridge and projects from a rear surface of the bearing plate, said rear surface being further formed with a central bearing journal for reception of a motor shaft bearing, and an opening in the bearing plate within the journal through which the motor shaft extends into the tool head.

6. The portable power tool of claim 5, further including a journal formed on the front surface of the bearing plate adjacent the opening for reception of a tool head shaft.

7. The portable power tool of claim 4, wherein said bearing plate further includes a plurality of corners respectively projecting outwardly from the mounting ridge, each corner having a tapped hole for reception of a respective one of the screws.

8. The portable power tool of claim 7, wherein said clamping flange is dispposed forwardly of said corners to capture and encompass the corners and is further formed with untapped holes in alignment with said tapped holes.

9. The portable power tool of claim 7, wherein each tapped hole is formed with a boss projecting rearwardly to increase the axial extent of the tapped holes for improved fastening support.

10. The portable power tool of claim 7, wherein said annular mounting ridge is formed with forwardly extending guide projections, the stepped portion of the claiming flange defining said annular groove further defining a radially outward facing annular alignment surface projecting forwardly from the front surface of the clamping flange, said stepped portion including a plurality of stepped portions each respectively definging a radially outward facing annular alignment surface, said stepped portions being circumferentially spaced from each other with said guide projections extending between the stepped portion, said tool head containing interior alignment surfaces initially engageable with said guide projections and thereafter said annular alignment surfaces spaced radially inwardly adjacent thereto.

11. The portable power tool of claim 10, wherein said guide projections are respectively formed radially inwardly adjacent the tapped holes.

* * * * *